Aug. 21, 1945.　　　H. V. THADEN　　　2,383,227
APPARATUS FOR PRODUCING LAMINATED STRUCTURES
Filed May 8, 1943　　　2 Sheets-Sheet 1
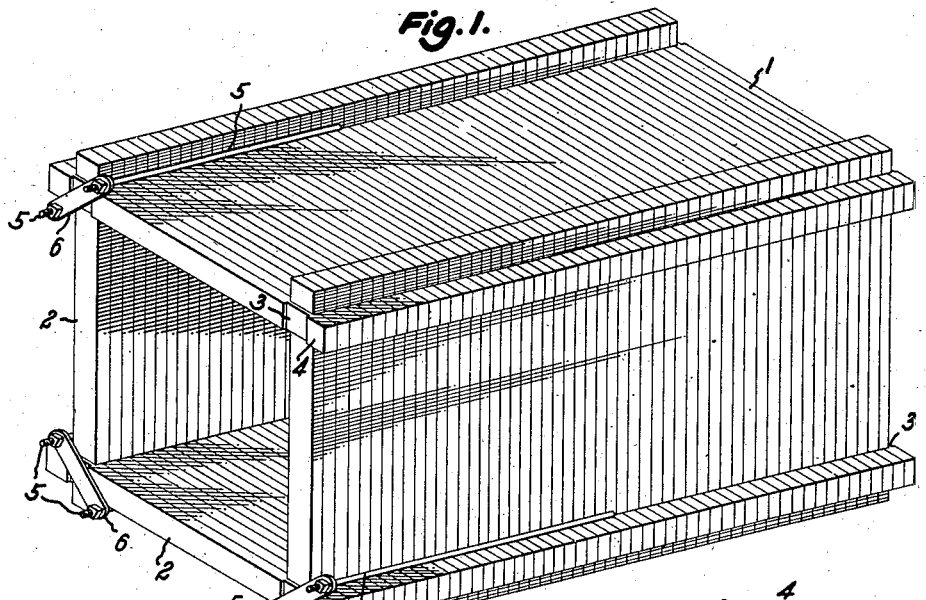
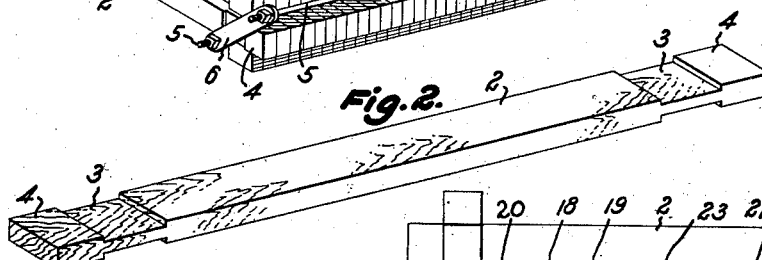
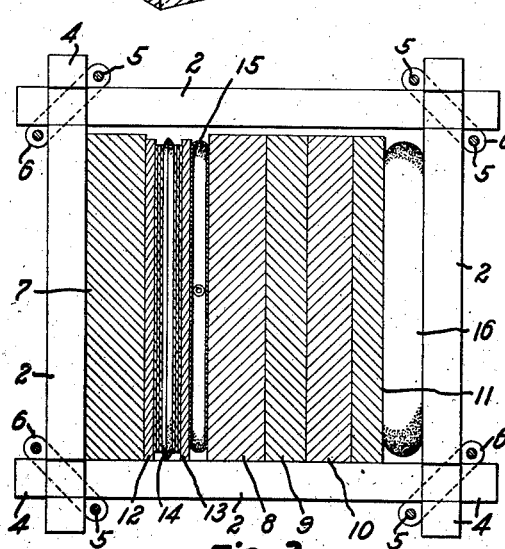
Inventor:
Herbert V. Thaden
By Pierce & Scheffler
his Attorneys.

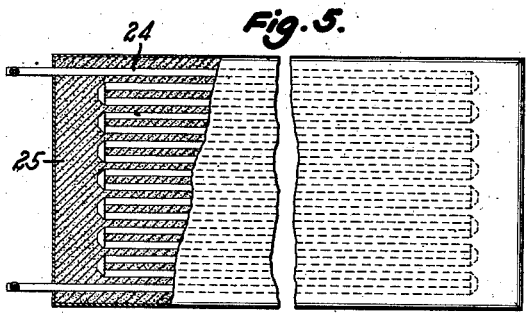
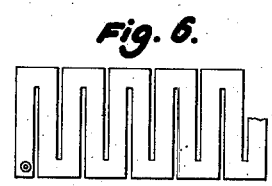
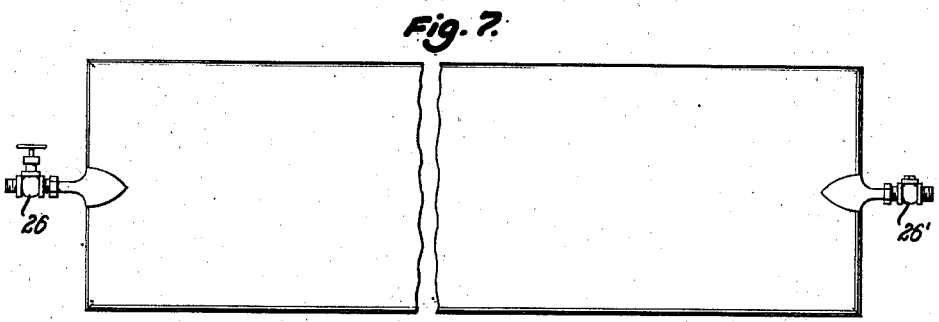
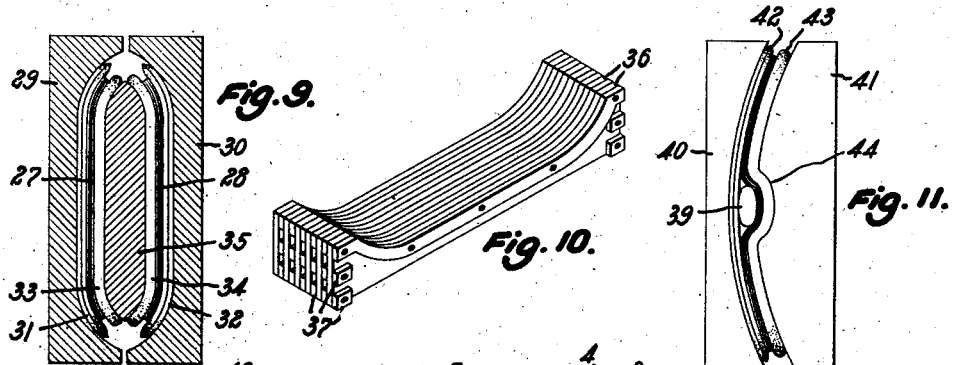
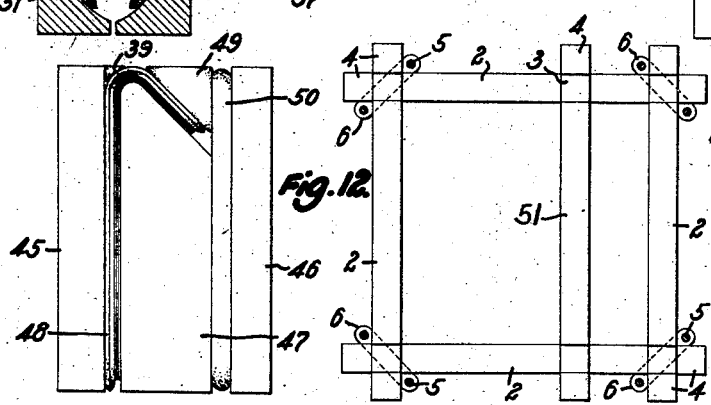

Patented Aug. 21, 1945

2,383,227

UNITED STATES PATENT OFFICE 2,383,227

APPARATUS FOR PRODUCING LAMINATED STRUCTURES

Herbert V. Thaden, Roanoke, Va., assignor to Thaden Engineering Company, Roanoke, Va., a company of Virginia Application May 8, 1943, Serial No. 486,222

5 Claims. (Cl. 144—281)

This invention relates to a method and apparatus which are readily adaptable for the production of all sorts of shapes and sizes of laminated structures including particularly flat or plane sheets of large sizes which cannot be made in conventional plywood or veneer presses and curved or shaped bodies of various sizes.

An object of the invention is to provide an apparatus and method which avoid the use of the conventional plate press and which also avoid the use of a pressure chamber or autoclave in which the article is subjected to hydraulic pressure.

A further object of the invention is to provide a method and apparatus for the production of laminated structures which are relatively inexpensive and which to a large extent avoid the use of critical structural materials such as structural steel.

The invention is applicable for the production of laminated structures of various sheet materials such as glass, cloth, paper, wood veneer, etc. but will be described and illustrated hereinafter with reference to the production of plywood from thin sheets of wood commonly referred to as veneer. The adhesive employed for binding the layers together may be any adhesive but the apparatus has been designed for use with thermoplastic and thermosetting or heat hardenable adhesives of the type of those containing phenol-aldehyde and urea-aldehyde resins.

The basis of my invention is the provision of a room or tunnel built up of wood timbers for containing the assembled sheets and for withstanding the pressure to which the assembly must be subjected. This basic concept called for the choice and adaptation of expedients for supporting the sheets, for heating them and for applying the necessary pressure. I have, for instance, made use of cauls of the desired shape for carrying and shaping the assembled sheets to be converted by heat and pressure into a laminated structure, of expansible and deformable fluid pressure containers for applying the desired pressure, of deformable or flexible heating elements for applying the necessary heat, of rigid filling members for filling the surplus space between the work and the walls of the pressure chamber, of flexible and expansible fluid pressure containers for filling the bulk of the space between the work and the walls of the pressure chamber and of differential deformable fluid pressure containers for applying pressure at points of sharp or irregular curvature.

These and other features of the invention will be described more fully in connection with the following detailed description of the apparatus in accordance with the invention and the method of using it.

Referring to the drawings:

Fig. 1 is a perspective view of the pressure chamber.

Fig. 2 is a perspective view of one of the structural members of which the pressure chamber is built.

Fig. 3 is an end view of the pressure chamber showing an arrangement of the work therein.

Fig. 4 is an end view of the pressure chamber showing another arrangement of the work.

Fig. 5 is a plan view with a portion broken away to reveal the internal structure of one form of heating element.

Fig. 6 is a plan view of another form of heating element adapted to be used in the heater of Fig. 5.

Fig. 7 is a plan view of a pressure applying element.

Fig. 8 is a front elevation of a modified form of pressure chamber divided into a plurality of compartments.

Fig. 9 is an end view of an arrangement of the work and cauls designed to produce a curved plywood structure.

Fig. 10 is a perspective view of one of the cauls of Fig. 9, and

Figs. 11 and 12 are end views of the work and cauls for producing other special shapes of plywood structure.

Referring to Fig. 1, the room or tunnel 1, which may be of any desired cross-section, say 8 feet high, 8 feet wide and of any desired length up to say 100 feet or more, is built up of the members 2, shown in detail in Fig. 2, made of wood such as hickory. In a particular instance in order to provide a tunnel 8 feet wide and 8 feet high and of sufficient strength to withstand pressure applied to the plywood of the order of 100 pounds per square inch, members 2 were made of integral wooden beams 4 inches thick and 12 inches wide arranged edgewise to the axis of the tunnel. The beams are notched at 3 at a substantial distance from the ends thereof so as to leave the projecting ends 4 of considerable length, say 1 foot long, to withstand the pressure within the tunnel. The beams may be held together by nails or bolts or the whole structure may be tied together by the tie rods 5 and end plates 6. As stated and as is apparent a room or tunnel constructed in this manner may be of any desired size and strength within the limits of the size and strength of available structural materials.

Referring to Fig. 3, I have illustrated an arrangement of work within the tunnel comprising the rigid filler members 7, 8, 9, 10 and 11 of different thicknesses, the flat caul boards 12 and 13 each supporting three sheets of veneer which are to be heated and pressed together to unite them into triple ply boards, the heater member 14, the pressure member or bag 15 and the relatively thick buffer bag 16. It will be appreciated that one would not ordinarily in mass production use so wide a room to make only two sheets of plywood and that the filler members 7, 8, 9, 10 and 11 or one or more of them would be replaced by additional assemblies of cauls, veneer packs and heater and pressure members. On the other hand, it is apparent that the room illustrated might be used to make a single sheet of plywood by the use of a sufficient thickness of filler members, or the room may be made sufficiently narrow that the flat rear face of the caul may bear against one wall of the room and the assembly of the caul, the laminated structure, the heater and the pressure bag will sufficiently fill the space between the opposite walls that inflation of the pressure bag will apply the desired pressure to the laminated structure.

In a typical instance, the sheets of wood veneer bearing coatings of a heat hardenable resin, such as phenol-aldehyde or urea aldehyde resin, are laid up on the flat caul boards 12 and 13 and tacked thereto around the edges. Any desired number of such assemblies are placed in the tunnel either vertically or horizontally with any suitable arrangement of heaters 14 and pressure bags 15. Generally it is possible satisfactorily to heat at least two assemblies of veneer by means of a single heater and in some instances it is possible to heat more than two assemblies, such as four or even six, but it will be appreciated that heat is conducted through wood only slowly and that increasing the number of assemblies to be heated by a single heater will prolong the heating operation. In other instances it may be desirable, particularly in the case of a thick assembly of plies, to omit the caul boards 12 and 13 and to heat each assembly of veneers on both sides as illustrated in Fig. 4.

The arrangement illustrated in Fig. 3, in which the heater is separated from the pressure member at least by a layer or assembly of plies, affords the advantage, as compared with the arrangement illustrated in Fig. 4, that the pressure bag is thereby protected against excessive heating and its life thereby greatly prolonged. This arrangement also apparently prolongs the life of the heater itself due to the fact that the work withdraws heat from the heater more rapidly than does a pressure bag or caul or filler member and thus prevents the heater from attaining as high a temperature or from continuing at its maximum temperature for so long a time.

To apply the desired pressure to the assembled veneers while they are being heated I insert parallel and adjacent thereto a flat envelope or bag which may be made of fabric suitably rendered gas-tight by coating or impregnation with rubber or the like, capable of withstanding the heat to which it will be subjected. As shown in the arrangement in Fig. 3, the pressure bag 15 is used to compress two assemblies of veneer but it will be appreciated that a variety of arrangements may be employed. In the arrangement illustrated in Fig. 3 the pressure bag is separated from the heater 14 by an assembly of veneers and the caul board 13, but, as shown in Fig. 4, the pressure bag may be arranged in contact with the heater. The pressure bag 15 of Fig. 3 is designed only for small expansion, say to a thickness of 2 or 3 inches.

It will be appreciated that although such a pressure bag is capable of applying the necessary high pressure, say 100 pounds per square inch, its small volume or capacity greatly reduces, as compared with the use of an autoclave enclosing the work, the amount of work required to apply the pressure and also reduces the danger of explosion to practically nil. If the bag bursts the release of the small amount of compressed air in it ordinarily does no harm and the absence of any heavy body which may be thrown by the explosion greatly reduces the danger. Even if the room or tunnel 1 were to break under the strain, the propulsive force of the small amount of compressed air within the pressure bag would be spent before the walls of the tunnel had been moved far enough to do any substantial harm or endanger the lives of workmen.

When the desired number of assemblies of veneer with heaters and pressure bags have been arranged in the tunnel the bulk of the remaining space, if any, is filled by filler members of appropriate thickness like members 7, 8, 9, 10 and 11 of Fig. 3 or 17, 18, 19, 20, 21 and 22 of Fig. 4. In an arrangement such as that described and illustrated in Fig. 3, it is practically impossible to pack the assemblies of veneer, caul boards, heaters, pressure bags and filler members so tightly that inflation of the thin pressure bag 15 will take up the free space within the tunnel and apply the desired pressure. I have therefore provided the buffer bag 16 which is a relatively thick pressure bag, i. e. capable of expanding to a thickness of say 6 inches or more. Inflation of bag 16 serves to take up the free space whereupon the bag 15 may be inflated to apply the desired pressure to the veneer assemblies. The buffer bag 16, although considerably larger than the pressure bag 15 still is sufficiently small to eliminate any real danger from explosion.

In the arrangement illustrated in Fig. 4, the buffer bag is omitted upon the assumption that in this instance it has been possible to pack the tunnel tightly enough that the pressure bag 23 will take up any free space and apply the desired pressure. In this instance also I have illustrated the use of a relatively thick pressure bag which may, in fact, be a buffer bag applied as a pressure bag.

The heater 14 must, of course, be flat and as nearly as possible of uniform thickness because at the pressures applied any projections would tend to cut into and mark the plywood. After considerable experimentation I have found that a heater as illustrated in Fig. 5 made up of thin ribbon 24 of a metal such as stainless steel which may be heated by the passage of electric current serves the purpose admirably. The ribbon may be mounted between layers of fabric 25 such as canvas or asbestos cloth. The size of the ribbon, voltage applied and electrical connections may be selected, as is well understood, to secure any desired temperature. The ribbon preferably is quite thin so as to be flexible and the strands are arranged relatively close together so as to give a uniform distribution of heat.

The heater element illustrated in Fig. 6 is, in many respects, an improvement over the form illustrated in Fig. 5. In this modification the heater element is simply cut from a flat sheet of the metal and has the advantage that it does not involve any sharp folds or bends which may result in breaking the metal and in thick spots which may cut through the protecting fabric or mark the work. The heater element of Fig. 6 has the further advantage that in large size heaters in which there is a considerable longitudinal expansion of the metal when it is heated, the zigzag shape absorbs this expansion and no harm is done; whereas the long heater elements of the heater of Fig. 5 may buckle and produce ridges and weak spots which may eventually result in breaks. These heater elements may be heated either by the passage of alternating or direct current or by high frequency induction heating.

The pressure bag, as illustrated in Fig. 7, may, as stated above, be made of a suitable fabric rendered air tight by coating with rubber or a suitable synthetic resin capable of withstanding temperatures in the neighborhood of 300 to 350° F. The edges may be reinforced if desired or at least made strong enough to withstand the pressure applied, say 100 pounds per square inch, bearing in mind that the edges are not supported by contact with any other part of the assembly. In use I have found that a pressure bag lasts longer and deteriorates less rapidly due to the heat to which it is subjected if it is cooled to some extent by a flow of air through it. This discovery was made in the use of pressure bags which leaked and which had continuously to be supplied with air to maintain the pressure. Consequently I have provided the pressure bag illustrated in Fig. 7 with the valved inlet 26 and a suitable outlet which may be controlled by a valve 26' adjustable to permit a continuous flow of air through the bag.

In the modified form of pressure room or tunnel illustrated in Fig. 8 I have provided a plurality of compartments which may be of the same or different sizes. In this construction the outer four walls are made in the same way as the structure illustrated in Fig. 1 and the partition wall 51 is made of beams the same as the outer walls, keyed at their ends to the beams of the top and bottom walls by notching both the wall beams and the partition beams so that the joints will resist pressure or thrust both laterally and longitudinally of the partition beams. This construction is advantageous where a large number of articles of the same size are to be made and flexibility as to the size of the pressure chamber is unnecessary. By making the pressure chamber of the proper size for a particular job the use of filler members such as 8–11 and 17–22 of Figs. 3 and 4 or buffer bag 16 or both may be obviated.

Fig. 9 illustrates the production of curved or warped structures. In this figure, for the sake of simplifying the showing, the pressure chamber or tunnel 1 is omitted. Two assemblies of veneer 27 and 28 are sandwiched between the cauls 29 and 30, the heaters 31 and 32, the pressure bags 33 and 34 and the caul 35. This entire assembly is placed in a tunnel of suitable size and any vacant space left in the tunnel is filled by suitable filler members and/or a bumper bag, if necessary, and pressure and heat applied. A caul, made of wood, such as that used in Fig. 9, is illustrated in Fig. 10. For lightness and strength the caul is made up of flat boards 36 of the desired shape separated and supported by the blocks 37 and the spacers 38.

It is noted that the tunnel 1 is capable of resisting pressure in every direction perpendicular to its axis. This is illustrated in the arrangements of Fig. 9 and Fig. 12. In the arrangement of Fig. 9 the cauls 29 and 30 resist the vertical forces but in the arrangement of Fig. 12 the top and bottom walls, as well as the side walls, of the room must resist the pressure exerted by the pressure bags. By arranging cauls or dies shaped like those of Fig. 9 longitudinally of the room so that their curved ends close the open end of the room, longitudinal pressure also may be applied. Thus it will be apparent that a spherical or hemispherical body may be formed and pressure applied to it in every direction as effectively as in an autoclave in which the object being molded is completely enclosed within a pressure chamber.

Figs. 11 and 12 illustrate the use of the auxiliary pressure bag 39. According to Fig. 11, it is supposed that a plywood article which is curved from end to end and has a ridge or reverse curvature near the middle is to be made. The assembly of veneers is sandwiched between the cauls 40 and 41 with the heater 42 and the pressure bag 43 and the auxiliary bag 39 is inserted opposite the depression 44 in the face of the caul 41. The resulting assembly is mounted in a tunnel such as that illustrated in Fig. 1, any remaining space is filled by filling members like 7 to 11 illustrated in Fig. 3, a buffer bag is inserted if necessary and inflated and then heat and pressure are applied by means of the heater 42, the pressure bag 43 and the auxiliary pressure bag 39.

Fig. 12 illustrates a still more difficult or complicated job of forming plywood to a particular shape which is quite readily done by the employment of my invention. In this figure the pressure chamber or tunnel is omitted from the showing. Members 45 and 46 may be regarded as being cauls or merely filler members. The veneer assembly is sandwiched between the member 45 and the caul 47 with the heater 48. The ends or edges of both the veneer and the heater are bent down over the caul 47 and held in place by the supplemental caul 49. The auxiliary pressure bag 39 when inflated serves to hold the sharply curved portion of the veneer assembly around the sharply curved end of the caul 47. The entire assembly 39, 45, 46, 47, 48, 49, 50, is inserted into or built up in a pressure chamber or tunnel which either is of the correct height to receive it or the upper portion of the chamber may be filled by one or more filler members and/or a buffer bag as described in connection with Fig. 3. Any lateral space within the chamber also may be filled by means of filler members and/or a buffer bag as required.

From the foregoing description of several applications of the invention it will be apparent that it is applicable for the production of all sorts of shapes and sizes of laminated articles. The basic concept of the invention is the provision of a pressure chamber or tunnel of fixed dimensions, which may be constructed of wood or any other suitable structural material and of any desired size depending upon the size of article to be produced, for use in combination with the use of cauls of suitable shape against which the article is molded, flexible heaters which readily conform to the shape of the article and flexible pressure bags capable of conforming to the shape of the article and of applying equal pressure over its surface. To this combination may be added the use of filler members, buffer bags and auxiliary or differential pressure bags.

I claim:

1. Apparatus for the production of laminated structures comprising a room of fixed dimensions which is closed on at least four sides by plane walls and open on at least one side in combination with at least one caul member having one side adapted to fit against one of said walls and its opposite side shaped to the desired shape of the laminated structure, at least one thin flexible sheet-like heater member and at least one thin flexible sheet-like pressure bag, said caul member, heater member and pressure bag together with the laminated structure being of such size as completely to fill the space between two opposite walls of said room when the bag is inflated, said heater member being adapted to transmit heat to and said bag being adapted to be inflated to apply pressure to an assembly of sheets of material arranged between said caul member and said heater.

2. Apparatus as defined in claim 1 comprising in combination rigid filler members for filling the space within the room not occupied by the assembly of caul member, sheets of material, heater member and pressure bag.

3. Apparatus as defined in claim 1 comprising in combination an inflatable buffer bag for filling the space within the room not occupied by the assembly of sheets of material, heater member, caul member and pressure bag.

4. Apparatus as defined in claim 1 comprising in combination rigid filler members and an inflatable buffer bag for filling the space within the room not occupied by assembled sheets of material, caul member, heater member and pressure bag.

5. Apparatus for the production of laminated structures as defined in claim 1 in which the shaped side of the caul member has a sharply curved area and the combination includes an auxiliary pressure bag member positioned to press against an assembly of veneers over said area.

HERBERT V. THADEN.